United States Patent [19]
Hershey et al.

[11] Patent Number: 5,526,283
[45] Date of Patent: Jun. 11, 1996

[54] REALTIME HIGH SPEED DATA CAPTURE IN RESPONSE TO AN EVENT

[75] Inventors: Paul C. Hershey, Manassas, Va.; John G. Waclawsky, Frederick, Md.

[73] Assignee: International Business Machines Corporation, Armonk, N.Y.

[21] Appl. No.: 188,175

[22] Filed: Jan. 26, 1994

[51] Int. Cl.$^6$ .................................................. H04L 12/26
[52] U.S. Cl. ................... 361/514 C; 364/551.01; 364/242.94; 370/17
[58] Field of Search ................... 364/514 C, 242.94, 364/242.95, 551.01; 371/20.1, 29.1; 370/17; 359/110

[56] References Cited

U.S. PATENT DOCUMENTS

| | | | |
|---|---|---|---|
| 4,227,245 | 10/1980 | Edbland et al. | 364/468 |
| 4,458,309 | 7/1984 | Wilder, Jr. | 364/200 |
| 4,459,656 | 7/1984 | Wilder, Jr. | 364/200 |
| 4,521,849 | 6/1985 | Wilder, Jr. | 364/200 |
| 4,779,194 | 10/1988 | Jennings et al. | 364/200 |
| 4,805,089 | 2/1989 | Lane et al. | 364/188 |
| 4,851,998 | 7/1989 | Hospodor | 364/300 |
| 4,905,171 | 2/1990 | Kiel et al. | 364/551.01 |
| 4,939,724 | 7/1990 | Ebersole | 370/85.15 |
| 4,944,038 | 7/1990 | Hardy et al. | 370/85.5 |
| 4,949,252 | 8/1990 | Hauge | 364/200 |
| 4,980,824 | 12/1990 | Tulpule et al. | 364/200 |
| 5,035,302 | 7/1991 | Thangavelu | 187/125 |
| 5,062,055 | 10/1991 | Chinnaswamy et al. | 364/513 |
| 5,067,107 | 11/1991 | Wade | 395/500 |
| 5,072,376 | 12/1991 | Ellsworth | 395/650 |
| 5,077,763 | 12/1991 | Gagnoud et al. | 377/16 |
| 5,079,760 | 1/1992 | Nemirovsky et al. | 370/17 |
| 5,084,871 | 1/1992 | Carn et al. | 370/94.1 |
| 5,197,127 | 3/1993 | Waclawsky et al. | 395/200 |
| 5,247,517 | 9/1993 | Ross et al. | 370/85.5 |
| 5,260,970 | 11/1993 | Henry et al. | 370/10 |
| 5,319,776 | 1/1994 | Hile et al. | 395/575 |
| 5,347,524 | 9/1994 | l'Anson et al. | 371/29.1 |
| 5,355,238 | 10/1994 | Kight et al. | 359/135 |
| 5,365,514 | 11/1994 | Hershey et al. | 370/17 |
| 5,375,070 | 12/1994 | Hershey et al. | 364/550 |
| 5,414,833 | 5/1995 | Hershey et al. | 395/575 |
| 5,442,639 | 8/1995 | Crowder et al. | 371/20.1 |
| 5,446,680 | 8/1995 | Sekiya et al. | 364/550 |

FOREIGN PATENT DOCUMENTS 61-53855  3/1986  Japan.

OTHER PUBLICATIONS

Dorshkind, "Troubleshooting: LANHawk tests FDDI networks", Digital Technology Inc, Oct., 1991.
Minoli, *1st, 2nd, & Next Generation LANs*, pp. 205–209, Sep. 1993.

*Primary Examiner*—Emanuel T. Voeltz
*Assistant Examiner*—Patrick J. Assouad
*Attorney, Agent, or Firm*—John E. Hoel; Joseph C. Redmond, Jr.; John D. Flynn

[57] ABSTRACT

A realtime high speed data capture is provided in response to a trigger bit pattern detected in a serial bit stream. An Event Driven Interface is connected to a data communications network to receive a serial bit stream. A capture buffer is connected to the network to store at least a portion of the serial bit stream. The capture buffer is selectively connected to the network by means of a gate. The Event Driven Interface is programmed to recognize a trigger bit pattern in the serial bit stream and to output an enable signal to the gate. In response to this, the capture buffer will store a predetermined portion of the serial bit stream from the network.

8 Claims, 4 Drawing Sheets

REALTIME HIGH SPEED DATA CAPTURE IN RESPONSE TO AN EVENT

BACKGROUND OF THE INVENTION

1. Technical Field

The invention disclosed broadly relates to the extraction of information from large bodies of data for high speed communication facilities. The invention is particularly directed to the realtime high speed data capture in response to an event.

2. Related Patent Applications

This patent application is related to the copending U.S. patent application Ser. No. 08/024,572, filed Mar. 1, 1993, entitled "Information Collection Architecture and Method for a Data Communications Network," now U.S. Pat. No. 5,375,070 by J. G. Waclawsky, et al., assigned to the IBM Corporation and incorporated herein by reference.

This patent application is also related to the copending U.S. patent application Ser. No. 08/024,575, filed Mar. 1, 1993, entitled "Event Driven Interface for a System for Monitoring and Controlling a Data Communications Network," now U.S. Pat. No. 5,365,514, by P. C. Hershey, et al., assigned to the IBM Corporation and incorporated herein by reference.

This patent application is also related to the copending U.S. patent application Ser. No. 08/024,542, filed Mar. 1, 1993, entitled "System and Method for Configuring an Event Driven Interface and Analyzing Its Output for Monitoring and Controlling a Data Communications Network," by J. G. Waclawsky, et al., assigned to the IBM Corporation and incorporated herein by reference.

This patent application is also related to the copending U.S. patent application Ser. No. 08/138,045, filed Oct. 15, 1993, entitled "System and Method for Adaptive, Active Monitoring of a Serial Data Stream Having a Characteristic Pattern," by P. C. Hershey, et al., assigned to the IBM Corporation and incorporated herein by reference.

Another related copending patent application is by J. G. Waclawsky, et al., entitled "Automated Benchmarking With Self Customization," Ser. No. 08/173,530, filed Dec. 23, 1993, assigned to the IBM Corporation and incorporated herein by reference.

Another related copending patent application is by J. G. Waclawsky, et al., entitled "Intelligent Realtime Monitoring," Ser. No. 08/172,701, filed Dec. 23, 1993, assigned to the IBM Corporation and incorporated herein by reference.

3. Background Information

The above cited Hershey, et al. patent application described an Event Driven Interface which is a pattern recognition technique applied to serial communications media to identify predefined bit patterns on the medium. Sometimes it is desirable to not only identify the occurrence of a particular bit pattern in the serial bit stream, but also to capture the actual bit pattern for subsequent analysis or processing.

OBJECTS OF THE INVENTION

It is therefore an object of the invention to capture data from a high speed communications network in realtime.

SUMMARY OF THE INVENTION

These and other objects, features and advantages are accomplished by the invention. An Event Driven Interface has its input coupled to a serial communications medium. The Event Driven Interface is programmed to identify predefined patterns of binary bits on the medium. In accordance with the invention, a capture buffer has its input coupled through a gate to the data communications network. A control connection is established between an output of the Event Driven Interface and the gate controlling the connection between the capture buffer and the data communications network. In accordance with the invention, when the preprogrammed Event Driven Interface identifies a particular pattern of bits on the data communications medium, which is intended as a triggering pattern for the capture of data from the network, the Event Driven Interface outputs an enabling signal to the gate coupling the input of the capture buffer to the data communications network, thereby enabling the capture buffer to be loaded with a prespecified portion of the serial bit stream on the data communications network.

The contents of the capture buffer can be used in a number of ways. Contents of the capture buffer may be used as an operand for further processing at the capturing node. Alternately, the contents or a portion of the contents of the capture buffer may be concatenated or otherwise combined with the event vector output from the Event Driven Interface, for use in analyzing the behavior or characteristics of the data communications network. The analysis of the properties of the data communications network can be done by means of an expert system analyzer, such as is described in the above cited Hershey, et al. patent application.

In this manner, realtime high speed data can be captured from a data communications network in response to events which are predefined as triggering bit patterns on the data communications network.

This invention also extends the architecture of the previous Information Collection Architecture (ICA) patent application Ser. Nos. 08/024,572, 08/024,575 and 08/024,542 to include the capability to capture data based on station location in a communications system. Such a communications system could be a single network or a number of different networks with different protocols that communicate with each other. By using this invention a network management facility can assess the effect of a single station on communications system network performance and quickly identify stations that are causing problems. A key advantage of this invention is that very little data need to be captured to assess network performance. Therefore, high speed application is possible. This invention also provides a framework within which the optimal location of ICA devices may be determined in order to maximize the benefit and minimize the cost of incorporating ICA technology into communications systems.

DESCRIPTION OF THE FIGURES

These and other objects, features and advantages will be more fully appreciated with reference to the accompanying figures.

DISCUSSION OF THE PREFERRED EMBODIMENT

Figure 1:
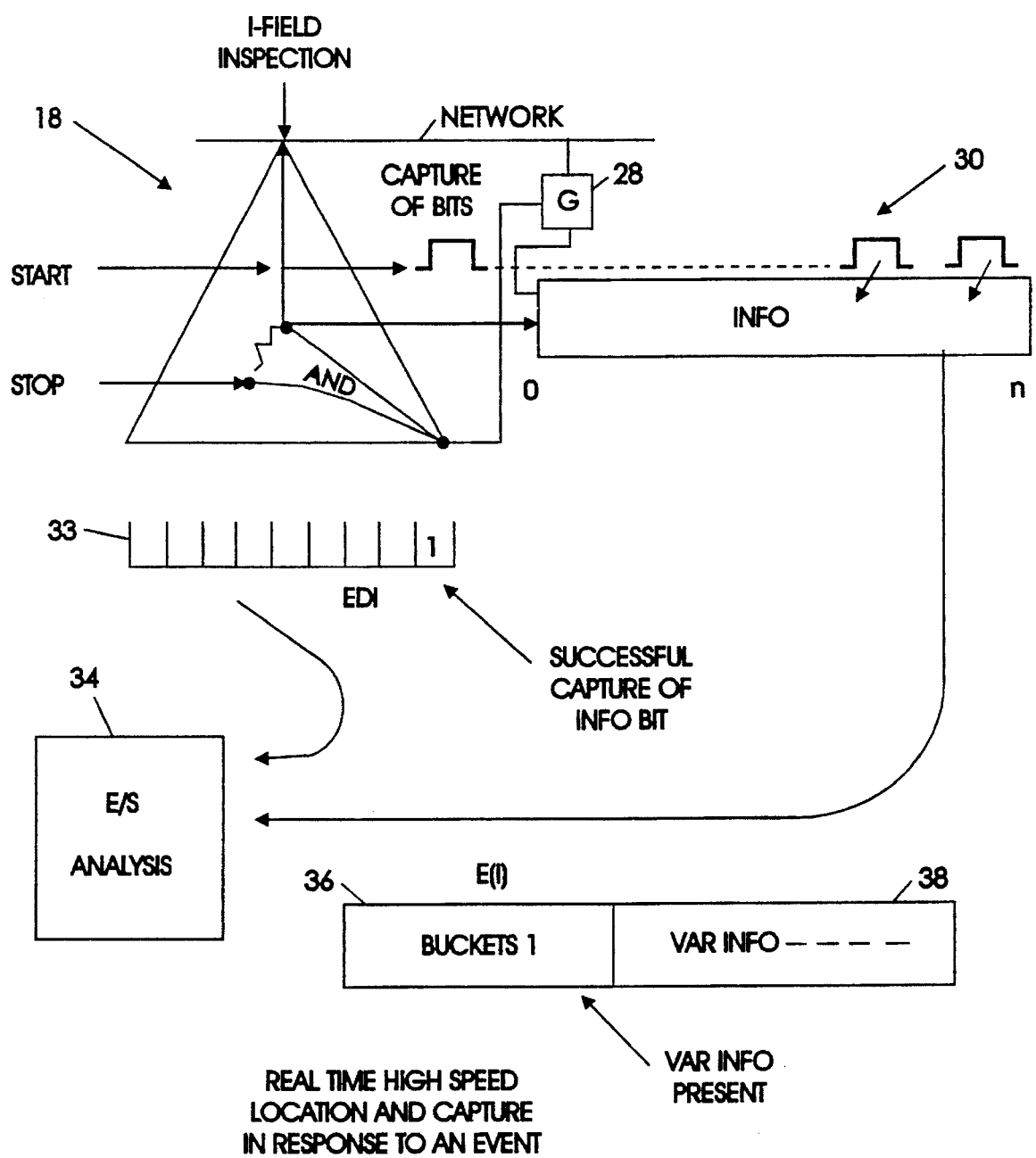
FIG. 1 is a schematic block diagram of the Event Driven Interface and capture buffer, in accordance with the invention.
Figure 2:
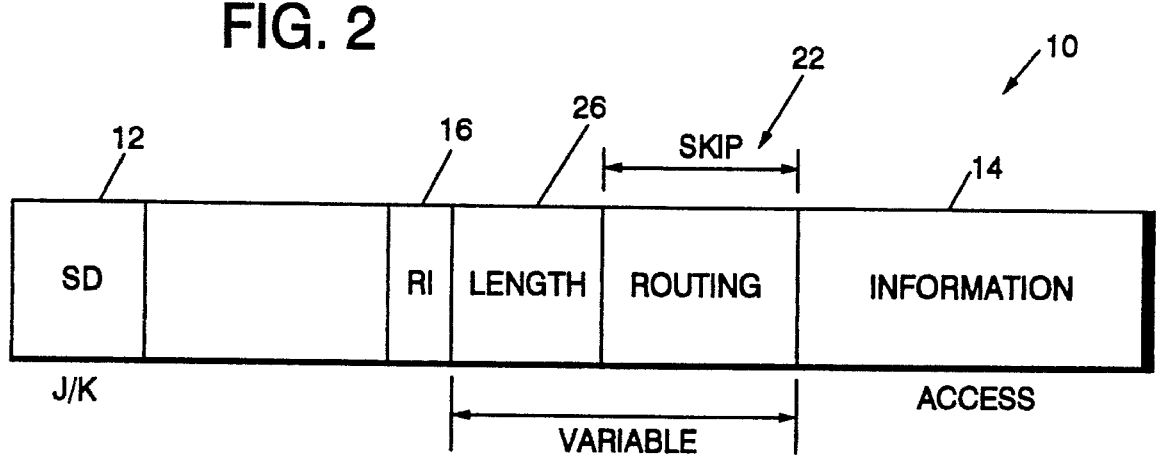
FIG. 2 illustrates the data frame format.

The problem solved in this invention is how to capture the actual sequence of bits in a field to be analyzed from a high speed frame of serial bits, in response to the detection of an event.

This invention relates to invention disclosure BT8-93-0054 and it also relates to the Event Driven Interface described in the above cited patent application Ser. No. 08/024,575. The figure shows an example field of information which is a frame as for example in a token ring LAN. The frame includes a beginning portion 12, a length field 26, whose value determines the length of a routing field 22 in the frame 10.

The problem to be solved is how to trap the contents of any field for subsequent analysis. This is done by means of the Event Driven Interface (EDI) 18 shown in the figure. The EDI 18 will perform pattern recognition in the manner described in the above cited patent application by Hershey, et al. The EDI 18 will recognize the pattern of an event and will activate a gate 28 to store the contents of the field in a capture buffer 30. A length value can be loaded as a count in a counter which will determine the number of subsequent bits which are to be loaded into an capture buffer 30 from the incoming serial bit stream from the network.

In accordance with the invention, the EDI 18 will continue to perform pattern matching as required, until the value in the length field 26 has been reached in the counter counting the bits being loaded into the capture buffer 30. Then, the EDI 18 can issue a signal which will dump the contents of the capture buffer 30 as a part of an event vector E(i) which is being formulated for the pattern recognition operation by the EDI in an event buffer 33, and that event vector can be transmitted to an expert system 34 for the appropriate analysis.

Thus, the event vector E(i) which is produced by the EDI 18, and which is sent to the expert system for analysis, can have two different parts; a first part 36 is the accumulated counts of the respective patterns detected by the EDI, and a second part 38 is the trapped data from the input data stream which was captured by the capture buffer 30. In this manner, a detailed analysis of the contents of an information field, for example the information field 14, can be analyzed in the expert system, along with the heuristic information from the counters counting the patterns in the network. This information can be used as a basis to control the network. For example if invalid account numbers are detected in the data bits, then the address of the data's origin as well as the invalid account number can be used in a message to a network control location. Alternately, a special frame can be sent to the origin of the data to force it to stop transmitting (i.e., a token ring "death frame" which forces device adapters to disconnect from the ring).

One potential usage of this particular invention is the ability to be able to trace activity on network links in realtime without the need to post-process data and without having extensive amounts of memory required to accomplish this process. The EDI mechanism provides a super efficient way of identifying specific events that we may wish to capture data on. By capturing data we mean, capturing some amount of bits from the media either predefined amount of bits or bits that are defined from the information on the data media itself. In other words, using something similar to indirect addressing Ser. No. 08/024,542, filed Mar. 1, 1993, and we can refer to another invention disclosure on that. For example, if you look at current trace techniques today, they usually trace the header as well as the customer's data that's embedded in a frame. The efficiency of the architecture such as SNA for example, says that when a customer has a lot of data to send the header represents only a few percentage points of the total amount or total volume of data transmitted, where the customer's data or the pay load of the frame represents 90 to 95 percent typically of the data flowing over the media. Currently today, most programs try to capture as much as they possibly can from the media, which means including the header and customer data. With this invention disclosure, we're enabling you to, in realtime, identify the header and trace only the header, in which case you can reduce the amount of data collected typically by 95 percent. In other words, a 95 percent reduction in the amount of data that's actually collected and returned to a location. Also, the same technique can be carried to even finer levels of detail and granularity by the EDI identifying that a specific event occurs, in which case we can capture specific fields, specific bytes or even specific bits of information and return only that to some location in the network to either reconstruct something of a flow of data over a period of time, or to do some kind of analysis or control the network environment. This data capturing facility invention coupled with the EDI provides us with extreme selectivity of the data that we capture from individual bits up to as much data as it goes across the media as you want.

Figure 3:
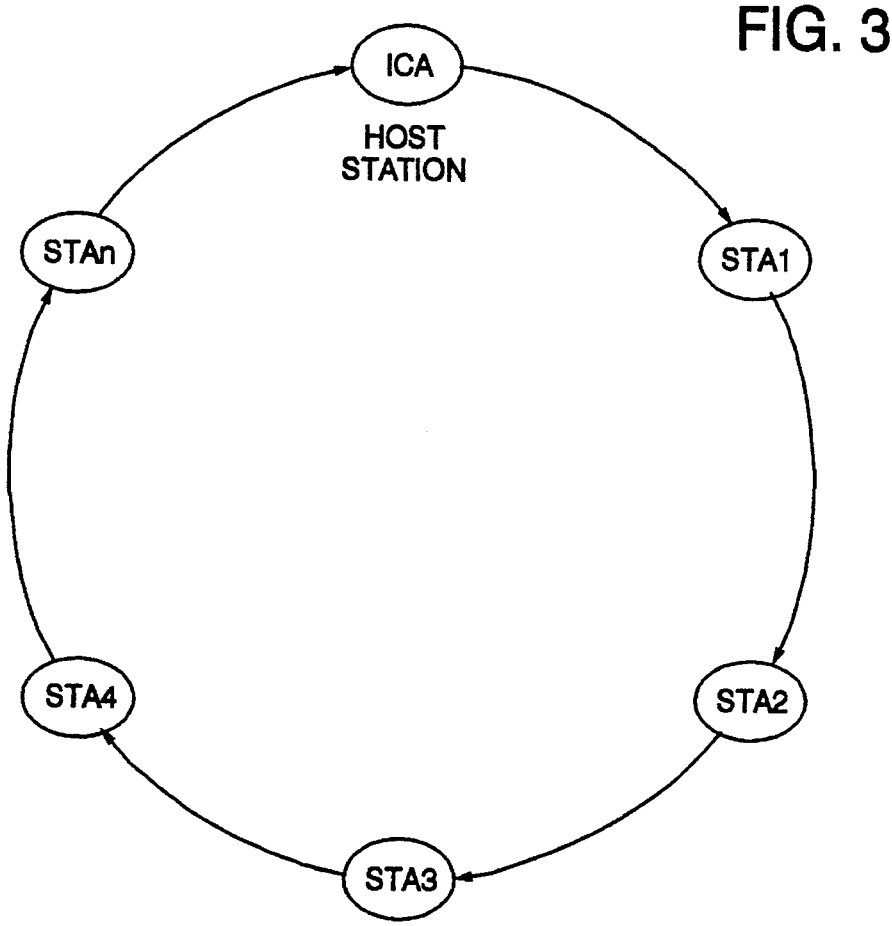
FIG. 3 illustrates ICA device location for a single network.
Figure 4:
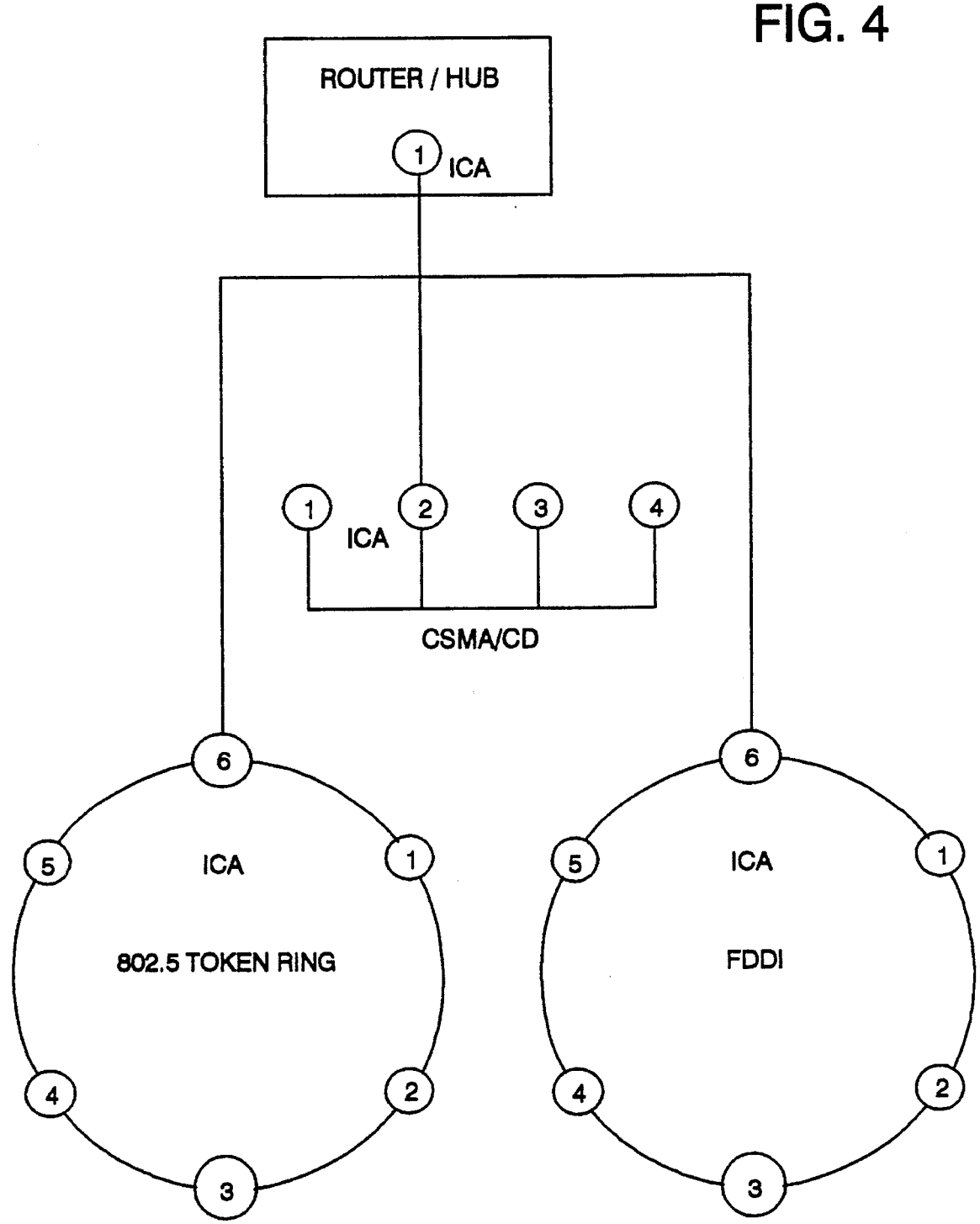
FIG. 4 illustrates the ICA device location for multiple networks.

The location of the ICA device in the network can be critical to achieving meaningful performance results. For example, assume that one wishes to use a single ICA device to measure performance for an IEEE 802.5 token ring network [1]. FIG. 3 depicts a possible ICA device location for this example. If the selected performance measure requires parameters such as Address Not Recognized, Not Frame Copied, Source Address, and Destination Address, then different results will be obtained depending on the location of the ICA device relative to the input or output of the network adapter within the ICA host station. If one wishes to assess the utilization of the token ring network, one possible utilization measure requires token rotation count as the only parameter that needs to be collected. For this example the ICA device location does not affect the results. For some applications, it can be useful to have one ICA device at the adapter input and one ICA device at the adapter output. Alternatively, we could design a dual ICA adapter to collect information at both the adaptor input and output.

Consider the example of simultaneously collecting data from multiple networks and protocols such as IEEE 802.5 [1], CSMA/CD [2], and FDDI [3], [4]. Ser. No. 08/187,950, filed Jan. 26, 1994 Disclosure BT993037 describes the use of the ICA for this scenario. Then the proper location of the ICA device would be in the bridge, router, or hub as shown in 4.

Figure 5:
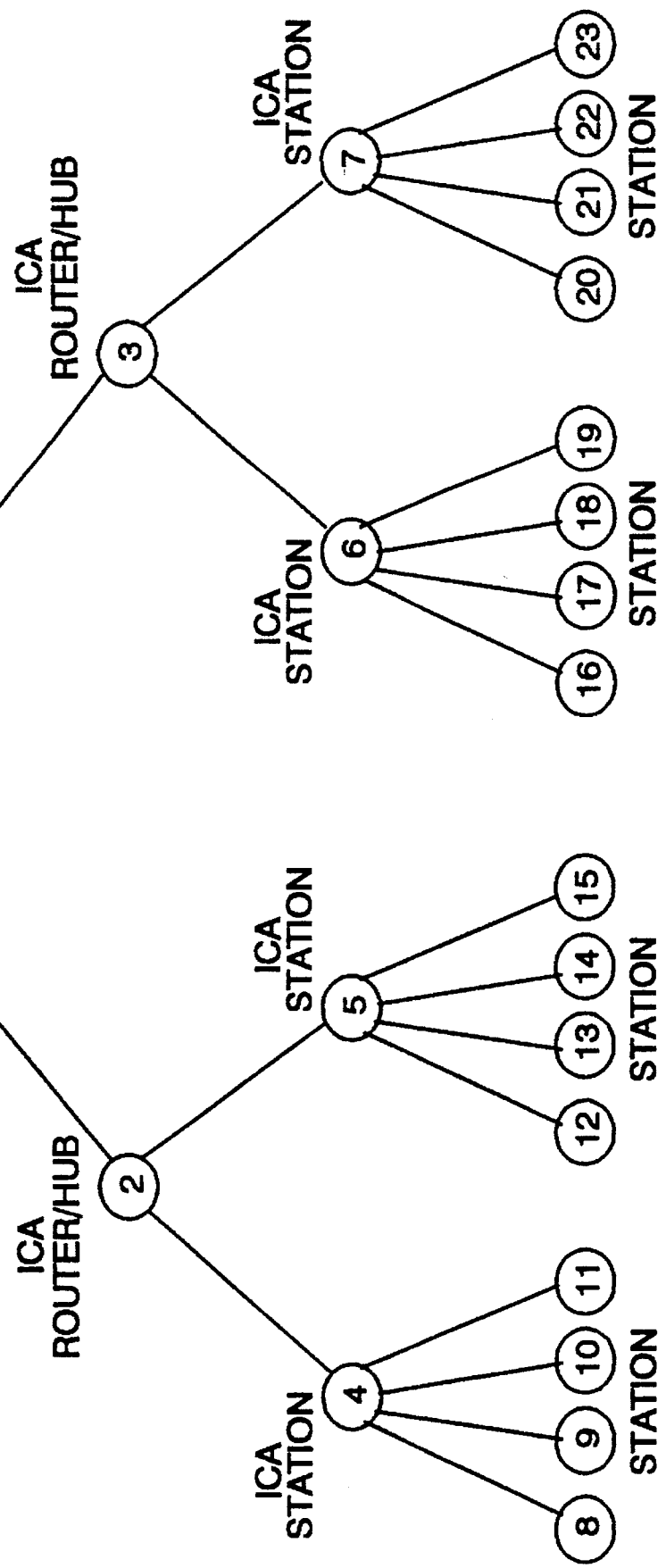
FIG. 5 illustrates the ICA device hierarchy.

Because not all network data passes through these higher layer devices, a better approach would be to locate an ICA device within each network and have the ICA device located at the hub monitor the ICA devices. An advantage of this ICA hierarchy is that rather than requiring one ICA device with enormous memory, we can distribute the data collection task amongst numerous ICA devices. Each of these devices requires less memory, and in fact could be a generic device applicable to all locations. FIG. 5 shows a possible ICA hierarchy.

REFERENCES

1. IEEE Standard 802.5, Token Ring Access Method, New York, N.Y., 1989.

2. ISO/IEC 8802-3, ANSI/IEEE Std 802.3, Part 3: Carrier Sense Multiple Access with Collision Detection (CSMA/CD) Access Method and Physical Layer Specifications, New York, N.Y., 1992.

3. ANSI, Inc., ANSI Standard X3.139, Fiber Distributed Data Interface (FDDI) Token Ring Access Control (MAC), New York, N.Y., 1987.

4. ANSI, Inc., ANSI Standard X3T9/90-X3T9.5/88-139, Fiber Distributed Data Interface (FDDI) Media Access Control (MAC-2), New York, N.Y., Oct. 1990.

Although a specific embodiment of the invention has been disclosed, it will be understood by those having an extraordinary skill in the art, that changes can be made to that specific embodiment without departing from the spirit and the scope of the invention.

What is claimed is:

1. In a system for monitoring and controlling a data communications network which communicates a serial stream of binary bits having a characteristic pattern, apparatus for realtime high speed capture of data in response to an event, comprising:

an Event Driven Interface having an input coupled to said network to receive a serial bit stream, and providing as outputs various event counts and lengths of traffic patterns in the serial stream;

a capture buffer having an input coupled to said network to store a portion of said serial bit stream;

a gate coupled between said network and said capture buffer, to selectively connect said capture buffer to said network in response to an enable signal from said Event Driven Interface;

said Event Driven Interface programmed to recognize a trigger bit pattern in said serial bit stream and output the enable signal to said gate in response thereto;

said capture buffer storing a predetermined portion of said serial bit stream from said network in response to said Event Driven Interface identifying said trigger bit pattern; and the Event Driven Interface issuing a signal to the capture buffer to output the predetermined portion of the serial bit stream, upon a selected event count being achieved in an output of the Event Driven Interface.

2. The apparatus of claim 1 which further comprises:

an event vector buffer connected to an output of said Event Driven Interface, for storing event counts as event vectors;

said event vector buffer and said capture buffer concatenating said event counts and said contents of said capture buffer, to form an augmented event vector containing event counts and the predetermined portion of the serial bit stream;

said augmented event vector being used for analysis and control of said data communications network.

3. The apparatus of claim 2 wherein the data communication network is monitored and controlled in real time without post processing data in the network.

4. The apparatus of claim 3 wherein the Event Driven Interface is a passive device.

5. The apparatus of claim 4 wherein the passive device is a programmable digital filter.

6. The apparatus of claim 2 wherein the Event Driven Interface is selectively located in the network according to the network parameters sought to be measured.

7. The apparatus of claim 6 wherein the network comprises a hub coupled to a plurality of sub-networks, the hub and at least one sub-network containing an Event Driven Interface.

8. In a system for monitoring and controlling a data communications network which communicates a serial stream of binary bits having a characteristic pattern, a method for realtime high speed capture of data in response to an event, comprising the steps of:

(a) receiving a serial bit stream from the data communications network in a programmable digital filter;

(b) providing as outputs from the programmable digital filter various event counts and lengths of traffic patterns in the serial stream;

(c) programming the programmable digital filter to recognize a trigger bit pattern in said serial bit stream and output an enable signal upon identifying the trigger bit pattern;

(d) selectively connecting a capture buffer to said network in response to the enable signal; said capture buffer storing a predetermined portion of said serial bit stream from said network in response to said enable signal;

(e) issuing a signal from the programmable digital filter to the capture buffer to output the predetermined portion of the serial bit stream, upon a selected event count being achieved in an output of the programmable digital filter; and (f) forming an event vector for use in monitoring and controlling the data communications network, said event vector containing the event counts and the predetermined portion of the serial bit stream.

* * * * *